US00RE47161E

(19) United States
(12) Reissued Patent
Savage

(10) Patent Number: US RE47,161 E
(45) Date of Reissued Patent: Dec. 18, 2018

(54) PANTS

(71) Applicant: LULULEMON ATHLETICA CANADA INC., Vancouver (CA)

(72) Inventor: Shannon Savage, Vancouver (CA)

(73) Assignee: LULULEMON ATHLETICA CANADA INC., Vancouver (CA)

(21) Appl. No.: 29/559,022

(22) Filed: Mar. 23, 2016

Related U.S. Patent Documents

Reissue of:
(64) Patent No.: Des. 654,661
Issued: Feb. 28, 2012
Appl. No.: 29/396,448
Filed: Jun. 30, 2011

U.S. Applications:
(62) Division of application No. 29/518,388, filed on Feb. 23, 2015, which is a division of application No. (Continued)

(51) LOC (11) Cl. ..... 02-02
(52) U.S. Cl.
USPC ..... D2/742
(58) Field of Classification Search
USPC ..... D2/738, 742, 731; 2/227, 228, 238, 232
(Continued)

(56) References Cited

U.S. PATENT DOCUMENTS 4,625,336 A * 12/1986 Derderian ..... A41D 13/0015 2/227
D300,383 S 3/1989 Yasuda
(Continued)

*Primary Examiner* — Philip S Hyder

(74) *Attorney, Agent, or Firm* — Conneely PC; Joseph Conneely

(57) CLAIM

The ornamental design for pants, as shown and described.

DESCRIPTION

*This application is also a reissue of Design Pat. No. D654, 661, which issued from Design patent application Ser. No. 29/396,448.*

*Notice: More than one reissue application has been filed for the reissue of U.S. Design Pat. No. D654,661. The reissue applications are divisional reissue application Ser. No. 29/559,022 (the present application), divisional reissue application Ser. No. 29/518,388, and reissue application Ser. No. 29/483,494, all of which are reissues of U.S. Design Pat. No. D654,661.*

FIG. 1 is a front view of pants according to [a first embodiment of] the design;
FIG. 2 is a rear view thereof;
FIG. 3 is a right side view thereof;
FIG. 4 is a left side view thereof; *and,*
FIG. 5 is a front perspective view thereof[;
FIG. 6 is a rear view of pants according to a second embodiment of the design, the front, left side, and front perspective views being the same as FIGS. 1 and 4-5, respectively; and,
FIG. 7 is a right side view thereof.
The symbol depicted in FIGS. 6-7 forming part of the claimed design is a registered trademark of Lululemon Athletica Canada Inc].
*The broken lines shown in FIGS. 1-5 illustrate portions of the pants that form no part of the claimed design.*

1 Claim, 5 Drawing Sheets

Matter enclosed in heavy brackets [ ] appears in the original patent but forms no part of this reissue; matter printed in italics indicates the additions made by reissue.

(Amended)

Related U.S. Application Data

29/483,494, filed on Feb. 28, 2014, now Pat. No. Re. 46,331, which is an application for the reissue of Pat. No. Des. 654,661.

(58) Field of Classification Search
CPC ..... A41D 13/0015; A41D 1/08; A41D 7/005; A63B 21/055
See application file for complete search history.

(56) References Cited

U.S. PATENT DOCUMENTS 5,201,074 A * 4/1993 Dicker ..... A41D 13/0015 2/227
5,367,708 A * 11/1994 Fujimoto ..... A41D 13/0015 2/22
D404,538 S * 1/1999 Fujii ..... D2/742
D404,889 S * 2/1999 Fujii ..... D2/712
D412,610 S * 8/1999 Fujii ..... D2/712
D413,008 S * 8/1999 Fujii ..... D2/731
D420,781 S * 2/2000 Fujii ..... D2/742
D427,750 S * 7/2000 Fujii ..... D2/731
D460,606 S * 7/2002 Clark ..... D2/948
D465,078 S * 11/2002 Tanaka ..... D2/742
D465,315 S * 11/2002 Tanaka ..... D2/742
D465,900 S * 11/2002 Tanaka ..... D2/742
D466,674 S * 12/2002 Tanaka ..... D2/742
D505,770 S * 6/2005 Ota ..... D2/731
D507,857 S * 8/2005 Ota ..... D2/742
D512,203 S * 12/2005 Ota ..... D2/731
D513,830 S * 1/2006 Ota et al. ..... D2/731
D517,279 S * 3/2006 Fujii ..... D2/731
D517,280 S * 3/2006 Ota ..... D2/731
D520,715 S * 5/2006 Ota ..... A41D 13/0015 D2/731
D529,686 S * 10/2006 Ota ..... D2/742
D532,958 S * 12/2006 Kent ..... D2/742
D541,009 S * 4/2007 Ota ..... D2/731
7,229,390 B2 * 6/2007 Fujii ..... A41D 13/0015 2/2.16
7,506,274 B2 3/2009 Zhang et al.
7,526,929 B2 * 5/2009 Takamoto ..... A41D 13/0015 66/177
7,631,367 B2 * 12/2009 Caillibotte ..... A41D 13/0015 2/228
D608,527 S 1/2010 Chionna
7,730,552 B2 * 6/2010 Ota ..... A41D 13/0015 2/227
D619,784 S * 7/2010 Kanada et al. ..... D2/742
D622,480 S * 8/2010 Chionna ..... D2/742
7,814,576 B2 * 10/2010 Nakazawa ..... 2/227
7,861,319 B2 1/2011 Torry
7,941,871 B1 * 5/2011 Jorgensen ..... A41D 7/005 2/228
7,945,970 B2 5/2011 Belluye et al.
D641,134 S * 7/2011 Zarabi ..... D2/712
D641,539 S * 7/2011 Zarabi ..... D2/701
D648,922 S 11/2011 Evans et al.
2001/0014981 A1 * 8/2001 Fairhurst ..... A41D 7/00 2/69
2004/0255358 A1 * 12/2004 Ota ..... A41D 13/0015 2/69
2008/0083055 A1 * 4/2008 Onda ..... 2/455
2009/0293167 A1 * 12/2009 Kottler ..... 2/23

* cited by examiner

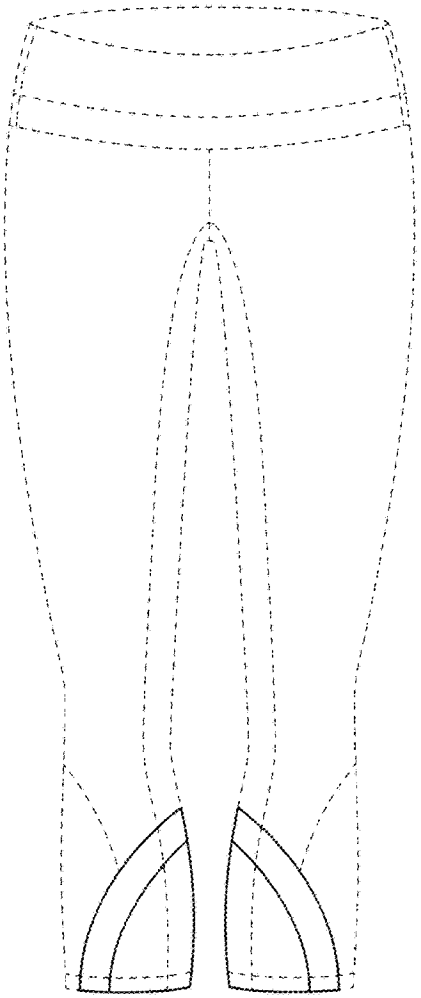
FIG. 1 (Amended)

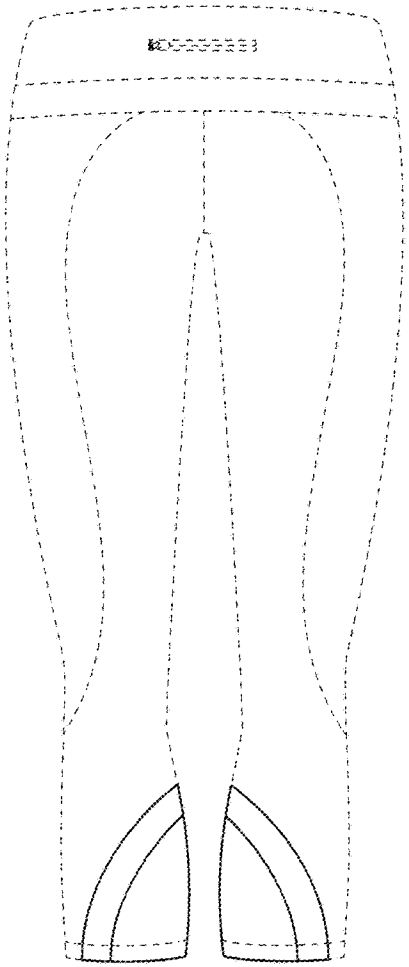
FIG. 2 (Amended)

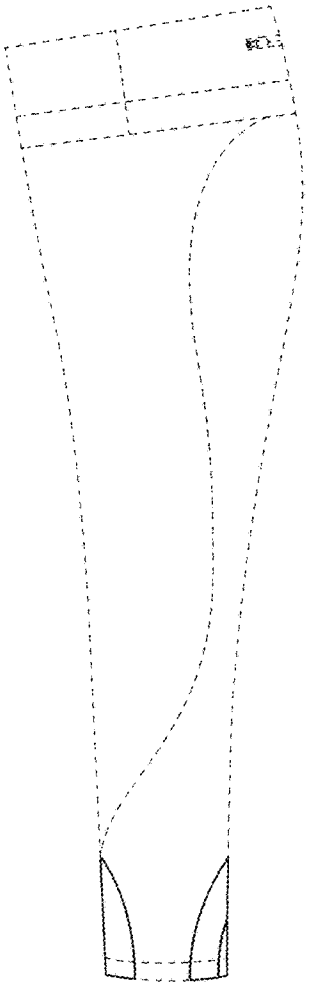
FIG. 3 (Amended)

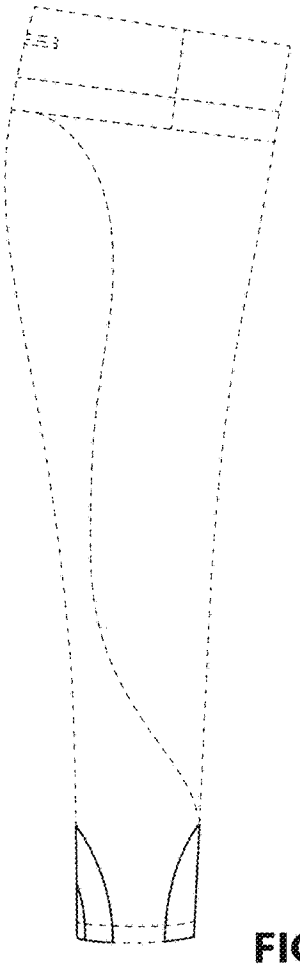
FIG. 4 (Amended)

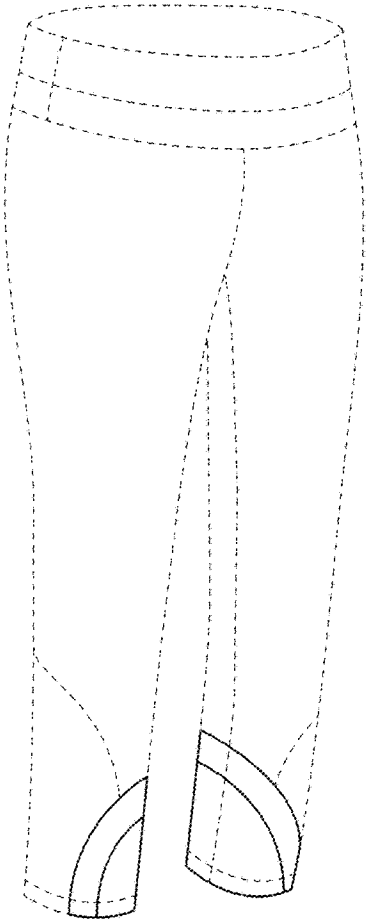
FIG. 5 (Amended)